(12) United States Patent
Shibayama et al.

(10) Patent No.: US 11,249,661 B2
(45) Date of Patent: Feb. 15, 2022

(54) INFORMATION PROCESSING APPARATUS, CONTROL METHOD, AND PROGRAM

(71) Applicant: LENOVO (SINGAPORE) PTE. LTD., Singapore (SG)

(72) Inventors: Kazuya Shibayama, Yokohama (JP); Ken Sasaki, Yokohama (JP); Yusaku Morishige, Yokohama (JP); Naoyuki Araki, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 162 days.

(21) Appl. No.: 16/775,447

(22) Filed: Jan. 29, 2020

(65) Prior Publication Data

US 2021/0042047 A1   Feb. 11, 2021

(30) Foreign Application Priority Data

Aug. 7, 2019   (JP) .............................. JP2019-145466

(51) Int. Cl.
*G06F 3/06*     (2006.01)
*G06F 13/16*    (2006.01)

(52) U.S. Cl.
CPC .......... *G06F 3/0632* (2013.01); *G06F 3/0604* (2013.01); *G06F 3/0659* (2013.01); *G06F 3/0679* (2013.01); *G06F 13/1668* (2013.01)

(58) Field of Classification Search
CPC .. G06F 11/1417; G06F 21/575; G06F 9/4401; G06F 11/2284; G06F 11/0793; G06F 9/4416; G06F 9/4406; G06F 11/1438; G06F 11/1441; G06F 21/572; G06F 2221/033; G06F 8/65; G06F 11/0721; G06F 11/0772; G06F 11/079; G06F 11/1048; G06F 11/22; G06F 3/0632; G06F 3/0604; G06F 3/0659; G06F 3/0679; G06F 13/1668
USPC ................... 713/2, 1, 100; 714/36, E11.133, 714/E11.149, E11.007, 2, 25, E11.025, 714/E11.145
See application file for complete search history.

(56) References Cited

U.S. PATENT DOCUMENTS 5,884,073 A * 3/1999 Dent .................. G06F 11/2294
                                                        713/2
5,974,546 A * 10/1999 Anderson ........... G06F 11/2284
                                                        713/2

(Continued)

FOREIGN PATENT DOCUMENTS

JP   2009271864 A   11/2009
JP   2011081617 A    4/2011
JP   2014115928 A    6/2014

*Primary Examiner* — Faisal M Zaman
(74) *Attorney, Agent, or Firm* — Shimokaji IP

(57) ABSTRACT

An information processing apparatus includes: a processing unit configured to write setting data to be used for boot processing by BIOS (Basic Input Output System) in a predetermined area of a non-volatile memory in an order of changing, and execute the boot processing based on the setting data; a writing unit configured to write at least one tag in the predetermined area of the non-volatile memory at a predetermined timing during the boot processing, the tag corresponding to the timing; and an instruction unit configured to instruct the processing unit to execute the boot processing using setting data written before the tag in the predetermined area of the non-volatile memory.

12 Claims, 12 Drawing Sheets

(56) References Cited

U.S. PATENT DOCUMENTS

| | | | | |
|---|---|---|---|---|
| 6,272,626 B1* | 8/2001 | Cobbett | G06F 11/1417 | 713/100 |
| 6,640,316 B1* | 10/2003 | Martin | G06F 11/1417 | 714/2 |
| 6,721,881 B1* | 4/2004 | Bian | G06F 9/4411 | 710/104 |
| 9,003,176 B1* | 4/2015 | Yakovlev | G06F 21/575 | 713/2 |
| 9,442,831 B1* | 9/2016 | Aleksyeyev | G06F 11/2284 | |
| 10,410,202 B1* | 9/2019 | Ng | G06F 1/08 | |
| 2007/0050612 A1* | 3/2007 | Chen | G06F 11/1417 | 713/100 |
| 2007/0055969 A1* | 3/2007 | Yang | G06F 11/1433 | 717/168 |
| 2008/0109648 A1* | 5/2008 | Weiberle | G06F 11/1417 | 713/2 |
| 2009/0172252 A1* | 7/2009 | Tomlin | G06F 8/654 | 711/103 |
| 2010/0185844 A1* | 7/2010 | George | G06F 9/4418 | 713/2 |
| 2012/0173859 A1* | 7/2012 | Wang | G06F 9/4401 | 713/2 |
| 2014/0372560 A1* | 12/2014 | Spottswood | H04L 69/161 | 709/217 |
| 2015/0280749 A1* | 10/2015 | Gjorup | G06F 11/1072 | 714/752 |
| 2015/0378846 A1* | 12/2015 | Hagiwara | G06F 21/575 | 714/19 |
| 2016/0306688 A1* | 10/2016 | Boyapalle | G06F 11/0748 | |
| 2016/0316370 A1* | 10/2016 | Boyapalle | H04W 12/04 | |
| 2017/0109220 A1* | 4/2017 | Suzuki | G06F 3/0617 | |
| 2018/0189496 A1* | 7/2018 | Wu | G06F 9/4401 | |
| 2019/0384614 A1* | 12/2019 | Kondapi | G06F 9/4408 | |
| 2020/0278873 A1* | 9/2020 | Hsu | G06F 11/3006 | |
| 2020/0387612 A1* | 12/2020 | Fan | G06F 21/64 | |
| 2021/0200640 A1* | 7/2021 | Stewart | G06F 11/0751 | |

* cited by examiner

INFORMATION PROCESSING APPARATUS, CONTROL METHOD, AND PROGRAM

FIELD OF THE INVENTION

The present invention relates to an information processing apparatus, a control method and a program.

BACKGROUND OF THE INVENTION

Information processing apparatuses may cause system trouble, such as boot failure, following a change of the BIOS (Basic Input Output System) settings. Such system trouble following the setting change may be recovered by initializing the settings (see Japanese Unexamined Patent Application Publication No. 2011-81617 A, for example).

The initialized settings of the BIOS do not reflect user's customized settings. This therefore causes problems, such as a failure to initialize the peripherals that are to be initialized by the BIOS and a change of the procedure for initialization processing. To avoid these problems, another recovery method saves a snapshot of the settings when the system boots up without problems and recovers the system with the saved settings.

SUMMARY OF THE INVENTION

Unlike simple initialization, such a method of saving a snapshot recovers the system by returning it to previous settings saved by the user. This method requires the user themselves to save the settings for recovery, and so the practicability of this method may be low due to the burdensome job.

In view of the above, the present invention aims to provide an information processing apparatus, a control method and a program capable of easily returning the settings of the information processing apparatus to previous settings for the boot by the BIOS.

To solve the problems, an information processing apparatus according to the first aspect of the present invention includes: a processing unit configured to write setting data to be used for boot processing by BIOS (Basic Input Output System) in a predetermined area of a non-volatile memory in an order of changing, and execute the boot processing based on the setting data; a writing unit configured to write at least one tag in the predetermined area of the non-volatile memory at a predetermined timing during the boot processing, the tag corresponding to the timing; and an instruction unit configured to instruct the processing unit to execute the boot processing using setting data written before the tag in the predetermined area of the non-volatile memory.

In the information processing apparatus, the predetermined timing may include an end timing of the boot processing.

In the information processing apparatus, the predetermined timing may include timing when the non-volatile memory is ready for data writing.

In the information processing apparatus, the boot processing may include setup processing enabling a user to change setting data used for the boot processing, and the predetermined timing may include a start timing of the setup processing.

In the information processing apparatus, the instruction unit may instruct the processing unit to execute the boot processing using the latest setting data for each of the settings among the setting data written before the tag in the predetermined area of the non-volatile memory.

In the information processing apparatus, the writing unit may write at least a part of setting data written before the tag in the predetermined area of the non-volatile memory to be used for the boot processing, the writing unit writing the part of setting data after setting data written at the end.

In the information processing apparatus, the instruction unit may instruct the processing unit to execute the boot processing using setting data written before the tag in the predetermined area of the non-volatile memory in accordance with user's operation.

In the information processing apparatus, the writing unit may be configured to write a plurality of the tags in the predetermined area of the non-volatile memory at a predetermined timing during the boot processing, and the instruction unit may instruct the processing unit to execute the boot processing using setting data written before the tag in the predetermined area based on types and continuity of the plurality of tags written in the predetermined area of the non-volatile memory.

In the information processing apparatus, the writing unit may be configured to write a plurality of the tags in the predetermined area of the non-volatile memory at a predetermined timing during the boot processing, and the instruction unit may instruct the processing unit to execute the boot processing using setting data written before the tag that is selected by a user among the plurality of tags written in the predetermined area of the non-volatile memory.

The information processing apparatus may further include a memory control unit configured to delete at least a part of the setting data written in the predetermined area depending on space of a writable area in the predetermined area of the non-volatile memory, the deleted part of the setting data being other than the latest setting data for each of the settings and in an area before a second tag traced back from a first tag written at the end by a predetermined number of the tags.

In the information processing apparatus, the memory control unit may delete setting data other than the latest setting data for each of the settings in areas between the tags after the second tag traced back from the first tag written at the end by a predetermined number of the tags.

A control method of an information processing apparatus according to the second aspect of the present invention includes: a step executed by a processing unit of writing setting data to be used for boot processing by BIOS (Basic Input Output System) in a predetermined area of a non-volatile memory in an order of changing, and executing the boot processing based on the setting data; a step executed by a writing unit of writing at least one tag in the predetermined area of the non-volatile memory at a predetermined timing during the boot processing, the tag corresponding to the timing; and a step executed by an instruction unit of instructing to execute the boot processing using setting data written before the tag in the predetermined area of the non-volatile memory.

A program according to the third aspect of the present invention makes a computer execute the following steps of: writing setting data to be used for boot processing by BIOS (Basic Input Output System) in a predetermined area of a non-volatile memory in an order of changing, and executing the boot processing based on the setting data; writing at least one tag in the predetermined area of the non-volatile memory at a predetermined timing during the boot processing, the tag corresponding to the timing; and instructing to execute the boot processing using setting data written before the tag in the predetermined area of the non-volatile memory.

The above-described aspects of the present invention easily returns the settings of an information processing apparatus to previous settings for BIOS boot.

DETAILED DESCRIPTION OF THE INVENTION

Referring to the attached drawings, the following describes one embodiment of the present invention in details.

(Configuration of Information Processing Apparatus 10)

Firstly the following describes a first embodiment of the present invention.

Figure 1:
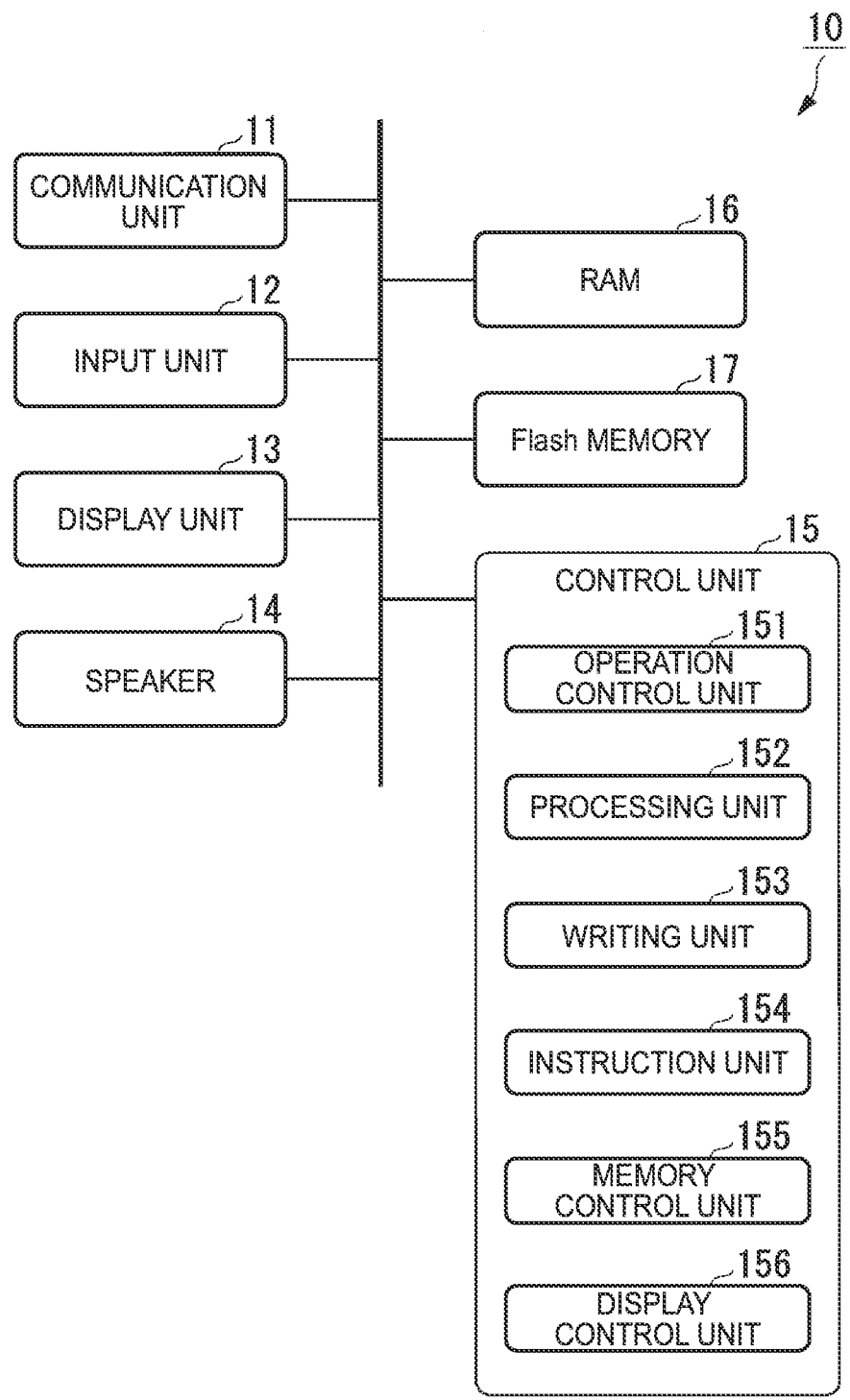
FIG. 1 is a block diagram showing an example of the configuration of an information processing apparatus according to one embodiment.

FIG. 1 is a block diagram showing one example of the configuration of an information processing apparatus 10 according to the present embodiment. In one example, the information processing apparatus 10 is a personal computer. The information processing apparatus 10 may be a personal computer of any type including a desktop type, a laptop type and a tablet type. In one example, the information processing apparatus 10 includes a communication unit 11, an input unit 12, a display unit 13, a speaker 14, a control unit 15, a RAM (Random Access Memory) 16, and a flash memory 17. These units are connected mutually via a bus so as to be communicable.

In one example, the communication unit 11 includes a plurality of Ethernet (registered trademark) ports, a plurality of digital input/output ports, such as a USB, and wireless communication, such as WiFi (registered trademark).

The input unit 12 receives a user's input operation to a keyboard and a touchpad of the personal computer 100, an operational button, such as a power button, or a touch panel configured to detect an operation on a display screen of the display unit 13. The input unit 12 may receive a user's input operation to a keyboard or a mouse connecting via the USB (Universal Serial Bus), or to an external operation device. The input unit 12 outputs an operation signal based on the received input operation.

The display unit 13 is a display to show video, images, text, and the like, and may include a liquid crystal display panel or an organic EL display panel, for example. The speaker 14 outputs electronic sound or sound, for example.

The control unit 15 includes a CPU (Central Processing Unit), a GPU (Graphic Processing Unit), an EC (Embedded Controller), and the like. The control unit 15 executes programs for a BIOS (Basic Input Output System), an OS (Operating System) or various applications to boot (activate) a system, such as the BIOS or the OS and conduct various types of calculation and processing. The control unit 15 reads and writes data and deletes the data in the RAM 16, the flash memory 17 and the like for memory control.

The control unit 15 expands a program and data for calculation, control and processing in the RAM 16, and saves or deletes various types of data in the RAM 16 as needed. The RAM 16 is a volatile memory, and so does not hold data when the power supply thereto stops.

The flash memory 17 is a non-volatile memory, such as a flash-ROM (Read Only Memory). That is, the flash memory 17 holds data even when the power supply thereto stops. In one example, the flash memory 17 is a SPI (Serial Peripheral Interface) flash memory. In one example, the flash memory 17 has a plurality of segmented data areas, including an area to save BIOS codes, an area to save setting data on the BIOS settings, and an area to save data necessary to the processing executed by the control unit 15. The following describes the control relating to the area to save setting data on the BIOS (hereinafter called a "setting-data save area").

The setting-data save area saves setting data on a plurality of settings used for the processing during the boot processing by the BIOS (or BIOS boot) (e.g., POST (Power On Self Test) processing), for example. For one setting, "Name", "ID", "Content (setting data)", and "Status" are saved as one block. "Name" is data indicating the name of the setting. "ID" is identification information on the setting. "Content (setting data)" is a value of the setting. "Status" indicates whether the data is valid/invalid. The setting-data save area saves the blocks in chronological order. When a setting data is written, one block having an effective "Status" is added. If a block having the same setting is already written, the "Status" of the block is changed into invalid.

Figure 2:
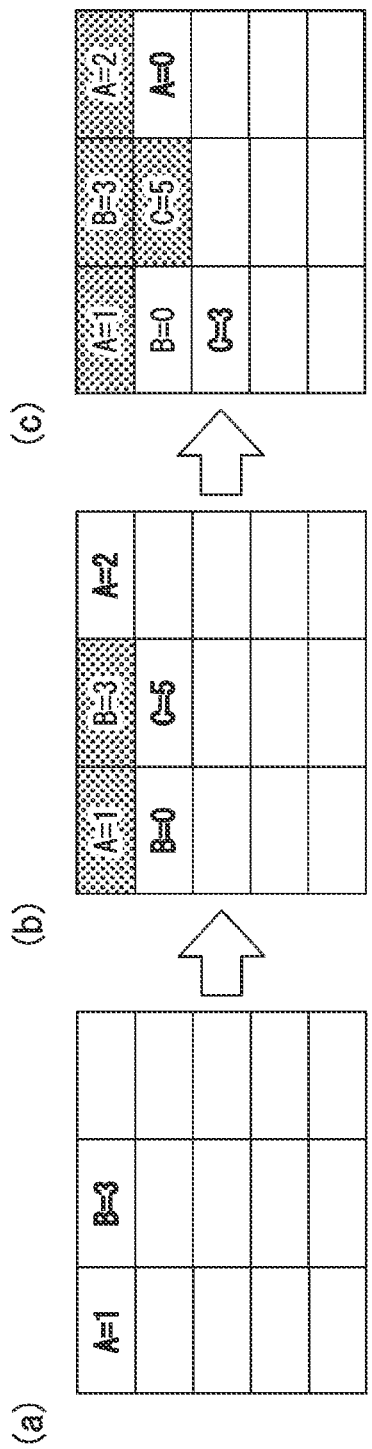
FIG. 2 shows the concept of the data write control in a flash memory.

FIG. 2 shows the concept of the data write control in the flash memory 17. The drawings (a) to (c) in FIG. 2 show the status of data written in the setting-data save area of the flash memory 17 in chronological order. For simplicity, these drawings show the setting-data save area having 15 block areas, and represent the settings and setting data with alphabets and numerals, respectively. The data is written in the order from upper left to lower right of the setting-data save area. The following describes these drawings in the order from (a) to (c).

The drawing (a) shows the setting-data save area where, from the state without data written (deleted state), "A=1" and "B=3" are written as the setting data of A and B under the control of the control unit 15. The latest written setting data (current setting data) is valid setting data.

Next the drawing (b) shows the setting-data save area where the control unit 15 changes the setting data of A and B to "A=2" and "B=0" and newly writes "C=5" as the setting data of C. In this case, the control unit 15 makes "A=1" and "B=3" that are written the last time invalid (the blocks with hatched background) and writes "A=2", "B=0", and "C=5" as new blocks. Now "A=2", "B=0" and "C=5" are valid data.

Next the drawing (c) shows the setting-data save area where the control unit 15 changes the setting data of A and C to "A=0" and "C=3". To this end, the control unit 15 makes the "A=2" and "C=5" that are written the last time invalid, and writes "A=0" and "C=3" in new areas (pages). Now "A=0", "B=0" and "C=3" are valid data.

In this way due to the characteristics of the flash memory 17, the control unit 15 updates the setting data of the same setting by making the setting data written the last time invalid and then writing valid data in a new area. This means that although the setting-data save area keeps data on not only the latest (current) setting data but also the setting data written in the past, the "Status" of the setting data written in the past is invalid. If system trouble occurs, such as a failure in normal ending of the BIOS boot, the control unit 15 uses the setting data written in the past to execute the recovery.

In one example, the control unit 15 writes a tag in the setting-data save area of the flash memory 17 at a predetermined timing (time) during the duration of BIOS boot. The tag is data as a marker to specify the predetermined timing during the duration of the boot processing. If trouble happens during the boot processing due to a change in the BIOS settings, for example, the control unit 15 uses such a written tag as a clue to return the BIOS settings to those in the past when the boot processing ended normally. In one example, the timing (time) to write a tag is timing (time) when the BIOS boot ends (ends normally).

Figure 3:
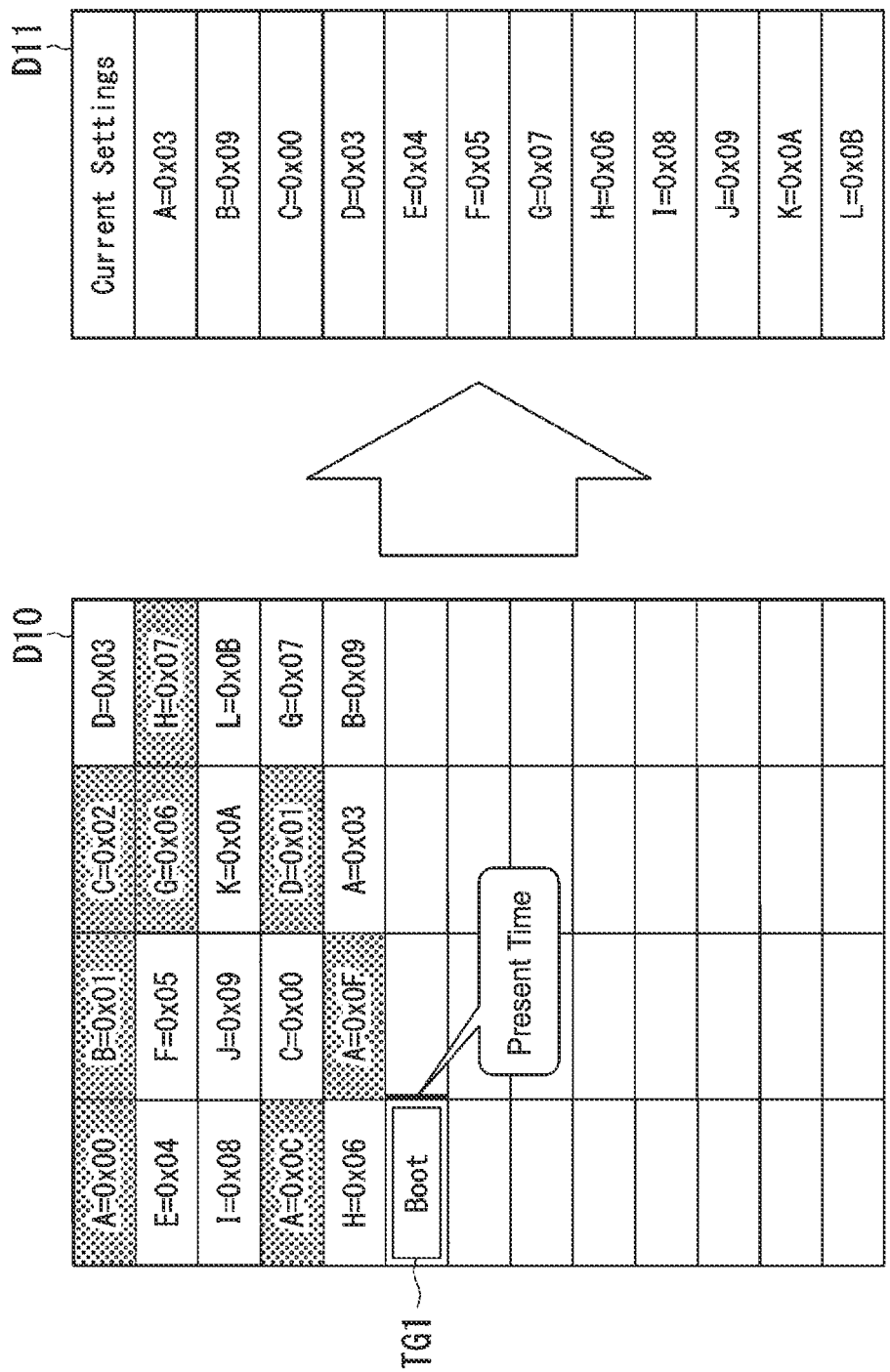
FIG. 3 schematically shows one example of the setting-data save area with a tag.

FIG. 3 schematically shows one example of the setting-data save area with a tag. The setting-data save area D10 shown includes a block indicated with TG1 that has a "Boot" tag written at the end timing of the BIOS boot. The "Boot" tag indicates that the boot normally ends. Before the "Boot" tag, the blocks with white backgrounds are the blocks having the currently latest setting data (valid setting data), and the blocks with hatched backgrounds are the blocks having the past setting data (invalid setting data). Blocks after the "Boot" tag (after the present time) are blank areas without written data. In other words, the BIOS settings (Current Settings) written in the setting-data save area D10 at the present time are the currently latest setting data (valid setting data) as indicated with D11, and the BIOS boot normally ends with this setting data. If the boot processing fails due to a change in the BIOS settings after that, the control unit 15 may search for the "Boot" tag. This enables normal boot processing with the latest setting data (the latest setting data before the "Boot" tag) at the writing timing of the "Boot" tag.

Figure 4:
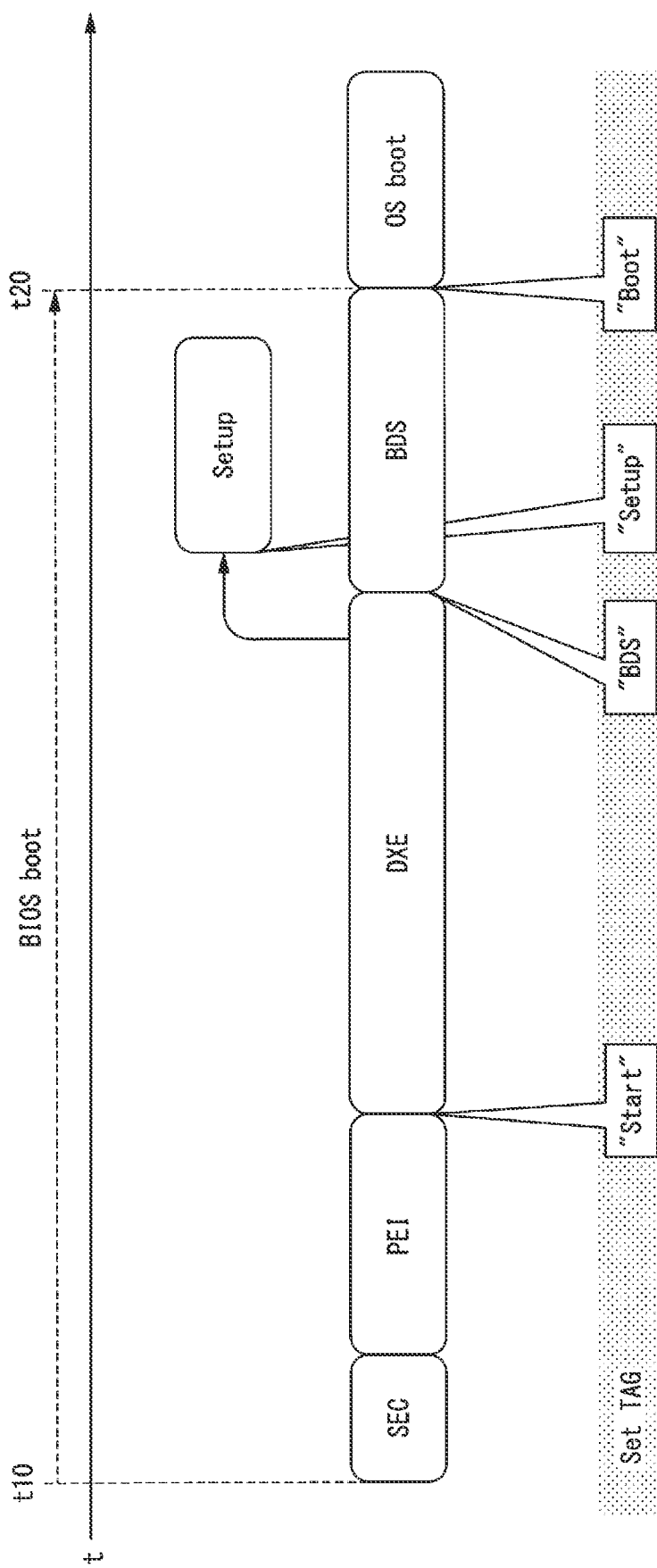
FIG. 4 shows the timing of writing a tag during the boot processing.

Next the following describes the write timing (time) of a tag in details. FIG. 4 shows the write timing of a tag during the boot processing. This drawing schematically shows the boot processing executed in response to the operation of a power button of the information processing apparatus 10, for example. The horizontal axis represents the time t. The duration from time t10 to time t20 is the boot processing by the BIOS (BIOS boot). Following the normal end of the BIOS boot, the boot processing by the OS (OS boot) starts. As described above, the control unit 15 writes a "Boot" tag in the setting-data save area at the end timing (time t20) of the BIOS boot.

The timing to write a tag may include timing (a time) instead of or in addition to the end timing of the boot processing. As shown in FIG. 4, the control unit 15 executes the BIOS boot in the order of SEC (Security), PEI (Pre EFI Initialization), DXE (Driver Execution Environment), and BDS (Boot Device Select). When a specific operation is performed during the duration of DXE processing, the control unit 15 executes Setup processing. The Setup processing is executed when the user changes the BIOS settings (setting data used for the boot processing). The control unit 15 starts the Setup processing in response to an operation signal output from the input unit 12, and controls the display unit 13 to display a Setup screen. When the BIOS settings are changed based on the user's operation on the Setup screen, the control unit 15 writes the setting data based on the changed settings in the setting-data save area. When the operation on the Setup screen ends, the control unit 15 ends the display on the Setup screen, and following reboot, executes the boot processing based on the latest setting data.

In one example, the control unit 15 may write a "Start" tag in the setting-data save area at a start timing of the DXE processing. The start timing of the DXE processing corresponds to the timing when the flash memory 17 is ready for data writing. The control unit 15 may write a "Setup" tag in the setting-data save area at a start timing of the Setup processing. The control unit 15 may write a "BDS" tag in the setting-data save area at a start timing of the BDS processing.

These tags contain information corresponding to the writing timings (e.g., Start, Setup, and Boot) and the date and time information (time stamps) on the timings, for example. In one example, when a plurality of tags of the same type is written, these tags are distinguishable based on their date and time information.

Figure 5:
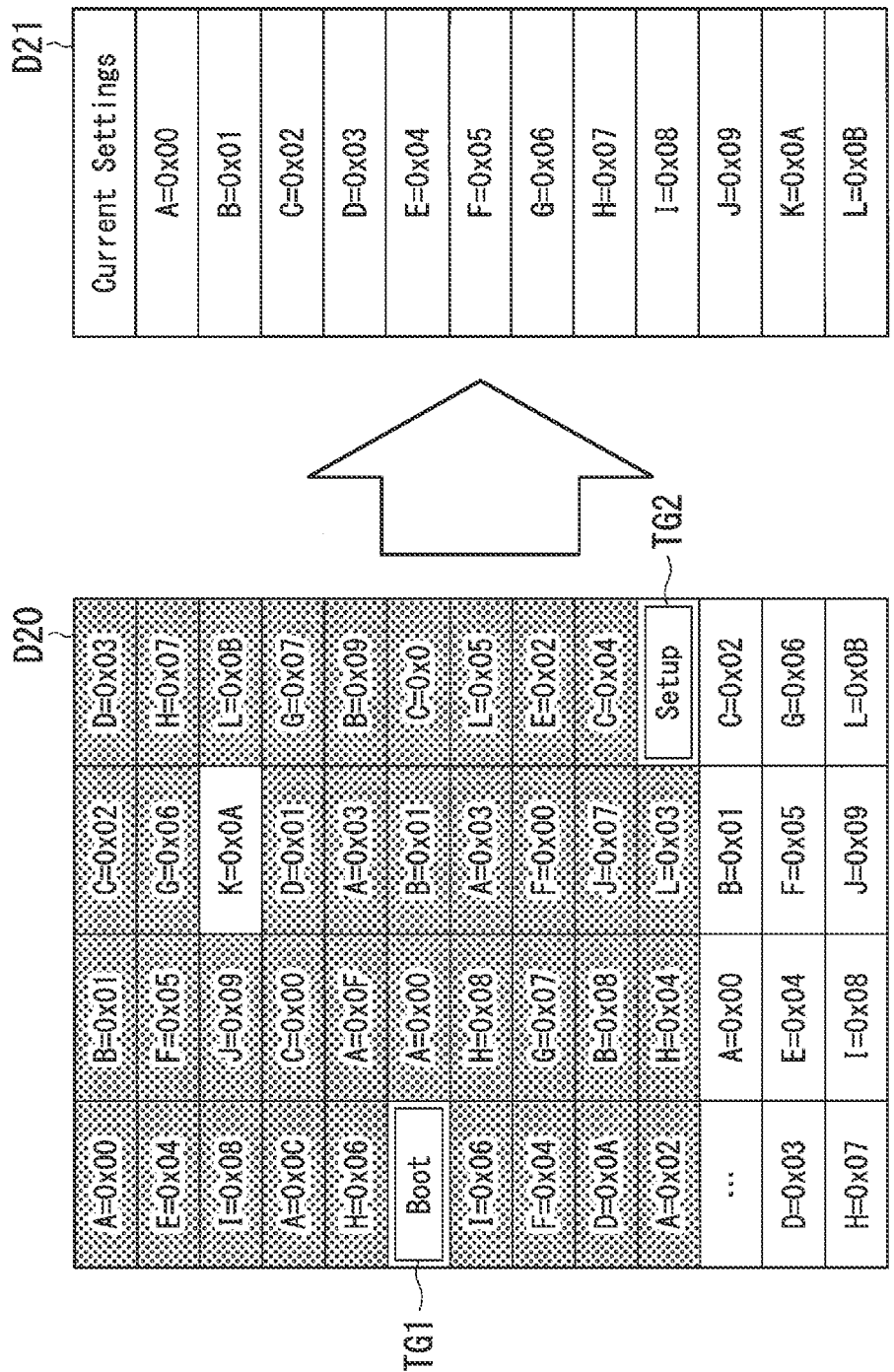
FIG. 5 shows one example of the setting-data save area after Setup processing.
Figure 6:
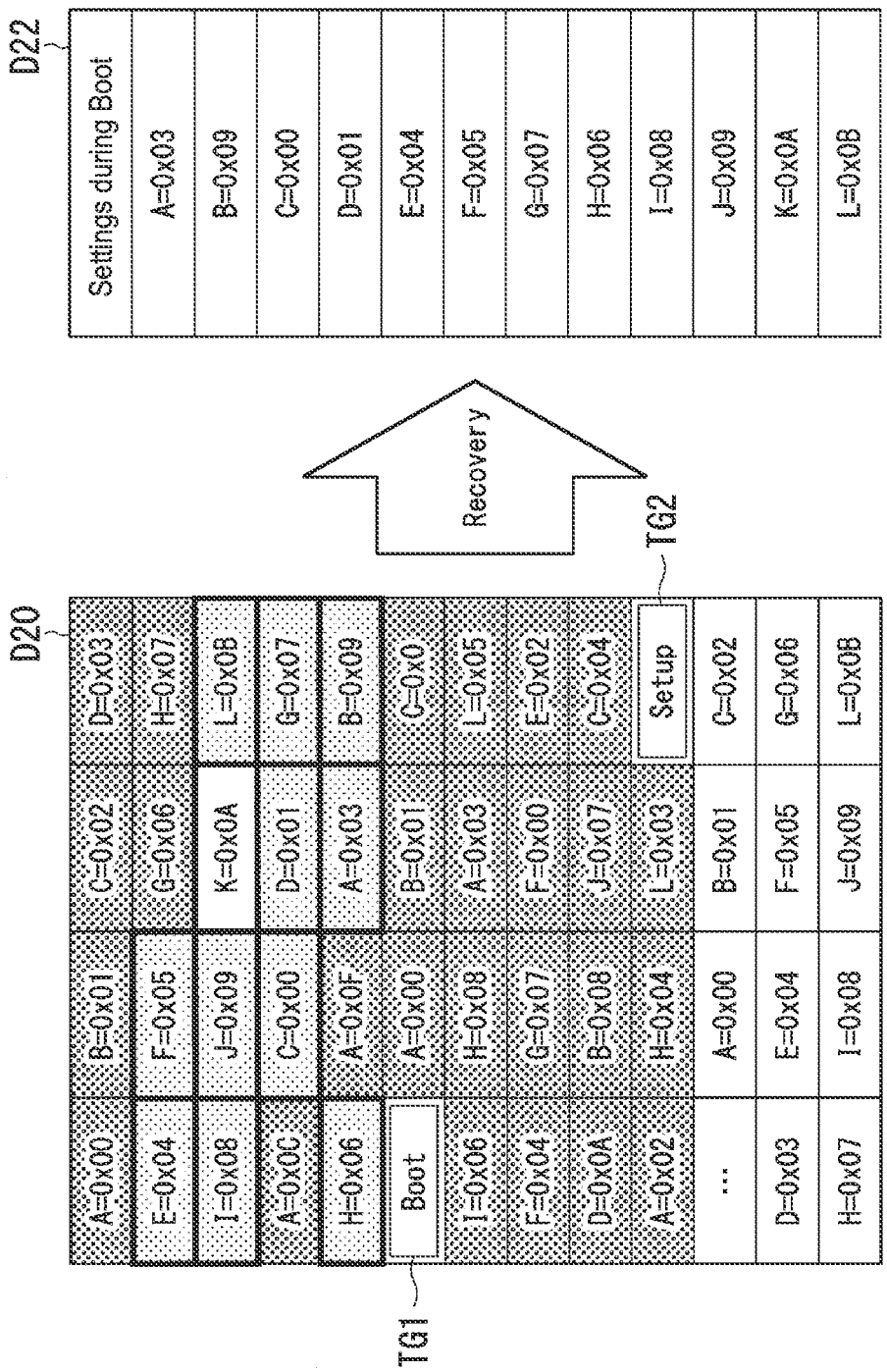
FIG. 6 shows one example of the setting data when the settings are returned to those in the last boot processing.

Next referring to FIG. 5 and FIG. 6, the following describes an example where, following a change of the BIOS settings by the user on the Setup screen, the control unit returns the BIOS settings to the settings when the BIOS boot processing is executed the last time (for recovery). FIG. 5 shows one example of the setting-data save area after the Setup processing following a change of the BIOS settings on the Setup screen. The setting-data save area D20 shown includes a block indicated with TG2 that has a "Setup" tag written at the start timing of the Setup processing. The setting data in the blocks written after the "Setup" tag is the latest setting data (valid setting data) that is changed at the Setup processing by the user's operation on the Setup screen. Among the setting data written in the past, the setting data changed at the Setup processing is made invalid, and the setting data that is not changed at the Setup setting and is the latest ("K=0x0A" in the drawing) remains valid. In other words, the BIOS settings (Current Settings) written in the setting-data save area D20 at the present time are the currently latest setting data (valid setting data) as indicated with D21. The setting-data save area D20 includes the block indicated with TG1 that has the "Boot" tag written at the end timing of the BIOS boot, which is executed before the writing of the "Setup" tag.

In one example, if normal end of the boot processing fails based on the setting data that is changed by the user's operation on the Setup screen, then the control unit 15 recovers the settings using the BIOS settings before the change. Specifically the control unit 15 searches for a "Boot" tag written before the "Setup" tag, and uses the latest setting data before the "Boot" tag (i.e., returns to the settings of the boot processing that normally ended the last time).

FIG. 6 shows one example of the setting data in the setting-data save area when the settings are returned to those of the last boot processing. In this drawing, the blocks with thick frames have the latest setting data written before the "Boot" tag (i.e., setting data of the last boot processing) in the setting-data save area D20 shown in FIG. 5. The BIOS settings (Settings during Boot) during the last boot shown with D22 are the setting data written in the blocks with thick frames. For recovery processing, the control unit 15 executes the boot processing using the BIOS settings during the last boot (Settings during BOOT) shown with D22 in FIG. 6 instead of the BIOS settings at the present time (Current Settings) shown with D21 in FIG. 5.

In one example, the control unit 15 may make the setting data of the blocks written after the "Setup" tag invalid in the setting-data save area of FIG. 6, and newly write the setting data during the last boot that is written in the thick-frame blocks before the "Boot" tag as valid data in the following area. After that, following reboot, the control unit 15 executes the BIOS boot using the setting data during the last boot.

The control unit 15 may use the latest setting data before the "Setup" tag for recovery using the BIOS settings before the change (i.e., may return to the settings before the change of the BIOS settings by the user's operation on the Setup screen).

Figure 7:
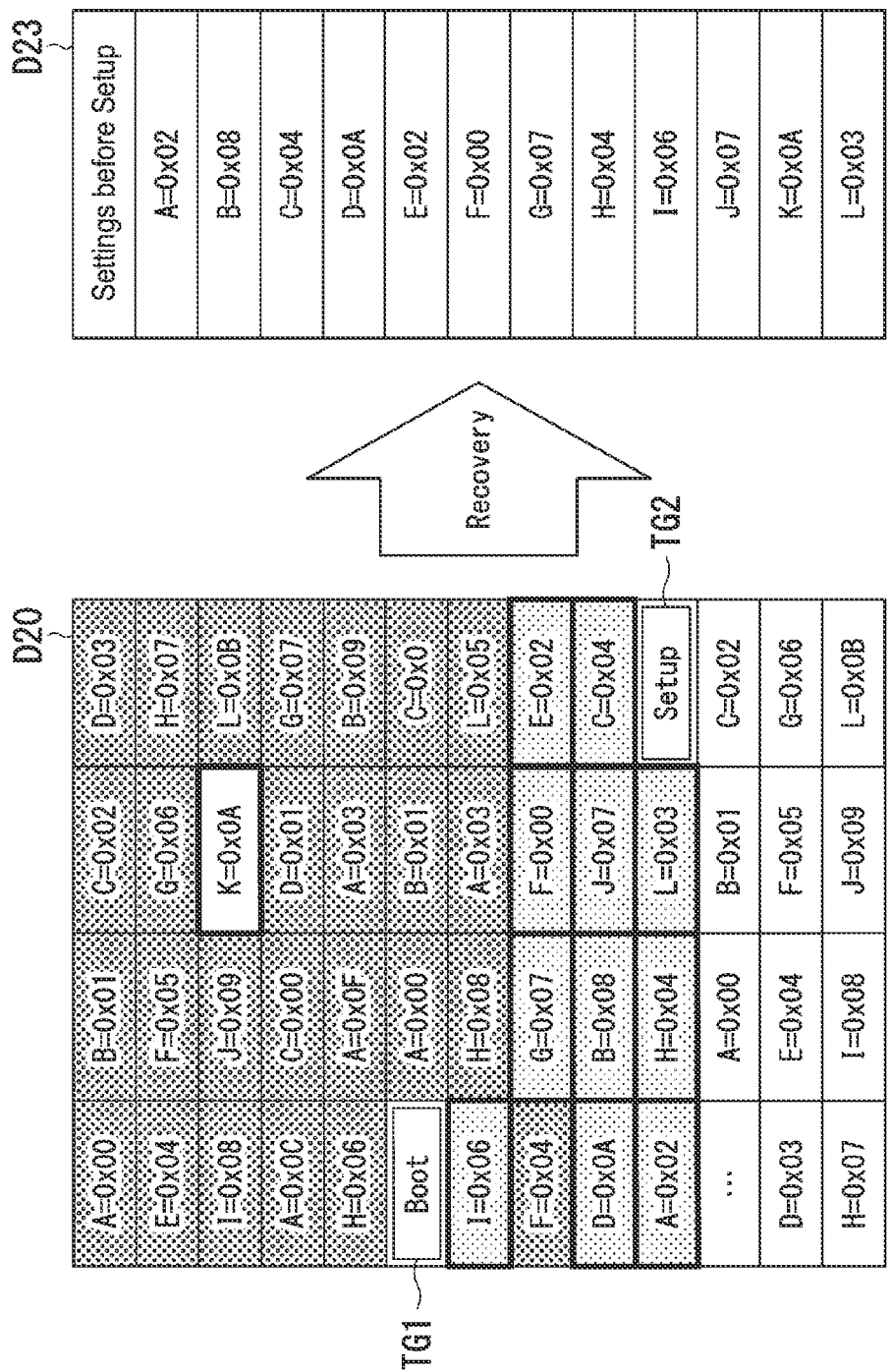
FIG. 7 shows one example of the setting data when the settings are returned to those before a change of the BIOS settings.

FIG. 7 shows one example of the setting data in the setting-data save area when the settings are returned to those before the change of the BIOS settings. In this drawing, the blocks with thick frames have the latest setting data written before the "Setup" tag (i.e., setting data before the Setup processing) in the setting-data save area D20 shown in FIG. 5. The BIOS settings (Settings before Setup) before the Setup processing shown with D23 are the setting data written in the blocks with thick frames. For recovery processing, the control unit 15 executes the boot processing using the BIOS settings before the Setup processing (Settings before Setup) shown with D23 in FIG. 7 instead of the BIOS settings at the present time (Current Settings) shown with D21 in FIG. 5.

In one example, the control unit 15 may make the setting data of the blocks written after the "Setup" tag invalid in the setting-data save area of FIG. 7, and newly write the setting data before the Setup processing that is written in the thick-frame blocks before the "Setup" tag as valid data in the following area. After that, following reboot, the control unit 15 executes the BIOS boot using the setting data before the Setup processing.

(Configuration of Control Unit 15)

Next the following describes the functional configuration of the control unit 15 in details.

Referring back to FIG. 1, the control unit 15 includes an operation control unit 151, a processing unit 152, a writing unit 153, an instruction unit 154, a memory control unit 155, and a display control unit 156.

The operation control unit 151 acquires an operation signal output from the input unit 12, and issues instructions, such as the boot, shutdown, transition to standby, and returning from standby based on the acquired operation signal. In one example, when the input unit 12 receives an input operation to the power button in the OFF state, the operation control unit 151 passes an instruction for boot to the processing unit 152.

The processing unit 152 executes the BIOS boot, the OS boot, various types of processing by OS after boot, and processing in an application running on the OS in accordance with their programs. When display information corresponding to the processing is displayed on the display unit 13, the processing unit 152 instructs the display control unit 156 as such. The processing unit 152 writes or deletes data in the flash memory 17 as needed during the execution of the processing as stated above.

In one example, as described above referring to FIG. 2, the processing unit 152 writes setting data used for BIOS boot in the units of blocks in the setting-data save area of the flash memory 17 in the order of changing (in chronological order). When the data is already written in a block of the same setting, the processing unit 152 changes the "Status" of the block to invalid (makes the setting data in that block invalid). Then the processing unit 152 executes BIOS boot using the setting data (valid setting data) written in the setting-data save area.

The writing unit 153 writes a corresponding tag in the setting-data save area of the flash memory 17 at a predetermined timing during the BIOS boot. In one example, the predetermined timing to write a tag includes an end timing of the BIOS boot. The writing unit 153 writes a "Boot" tag in the setting-data save area at an end timing of the BIOS boot. The predetermined timing to write a tag may include timing when the flash memory 17 is ready for data writing. In one example, the writing unit 153 writes a "Start" tag in the setting-data save area at a timing when the flash memory 17 is ready for data writing. The predetermined timing to write a tag may include a start timing of the Setup processing. In one example, the writing unit 153 writes a "Setup" tag in the setting-data save area at a start timing of the Setup processing.

The predetermined timing to write a tag may include a start timing of the BDS processing. In one example, the writing unit 153 writes a "BDS" tag in the setting-data save area at a start timing of the BDS processing.

For the setting data for boot processing, the writing unit 153 writes at least a part of the setting data that is written before a tag (e.g., "Boot" tag, "Setup" tag) in the setting-data save area of the flash memory 17 after the setting data written at the end. In one example, for recovery processing, the writing unit 153 makes the latest setting data in the setting-data save area invalid. The writing unit 153 then newly writes the latest setting data for each of the settings before the "Boot" tag or the "Setup" tag (i.e., setting data during the last boot or setting data before the Setup processing) as valid data in the following area.

After the writing unit 153 newly writes the latest setting data for each of the settings before the "Boot" tag or the "Setup" tag (i.e., setting data during the last boot or setting data before the Setup processing) as valid data for recovery processing, the instruction unit 154 instructs reboot. That is, the instruction unit 154 instructs the processing unit 152 to execute boot processing using the setting data written before the tag (e.g., "Boot" tag or "Setup" tag) in the setting-data save area of the flash memory 17. In one example, the instruction unit 154 instructs the processing unit 152 to execute boot processing using the latest setting data for each of the settings among the setting data written before the tag (e.g., "Boot" tag or "Setup" tag) in the setting-data save area. If normal ending of the boot processing using the current setting data fails, this configuration enables re-execution of the boot processing using the previous setting data for recovery.

In the following, the operating mode to execute the above-stated recovery processing is called a "recovery mode". In one example, the control unit 15 causes a transition to the recovery mode in response to user's operation as a trigger. Such user's operation as a trigger to transition to the recovery mode may be an operation of a specific key of the keyboard during a predetermined duration after the starting of the BIOS boot. In response to the user's operation, the instruction unit 154 instructs the processing unit 152 to execute boot processing using the setting data written before the tag (e.g., "Boot" tag or "Setup" tag) in the setting-data save area.

Figure 8:
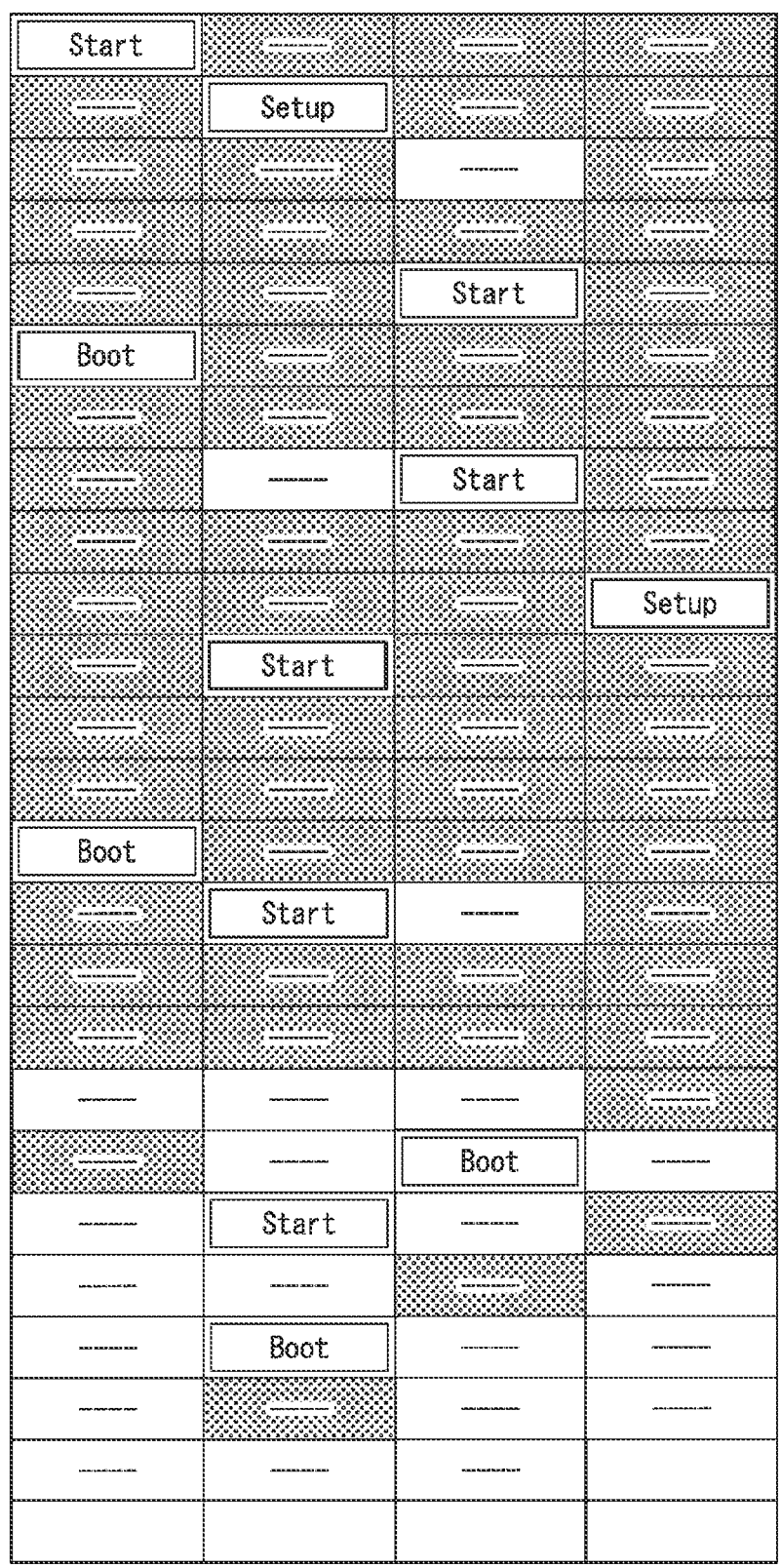
FIG. 8 shows one example of the setting-data save area with a plurality of written tags after a plurality of times of the boot.

FIG. 8 shows one example of the setting-data save area with a plurality of tags written after a plurality of times of the boot. A part from one "Start" tag to the next "Start" tag is the setting data changed during one boot processing. Similarly to setting data, these tags also are written for every boot processing. The control unit 15 enables recovery of setting data with the latest setting data at the write timing of each tag. This illustrated example includes a "Setup" tag or a "Boot" tag between one "Start" tag and the next "Start" tag. The "Setup" tag indicates that a transition to Setup processing happens during the boot processing. In the case of a transition to Setup processing, reboot follows the ending of the Setup processing. A tag to be written the next therefore will be a "Start" tag. The "Boot" tag indicates that the boot processing normally ends, and a tag to be written the next will be a "Start" tag for the next boot. In this way, when no trouble happens during the BIOS boot, another tag will be written between one "Start" tag and the next "Start" tag. On the contrary, when a plurality of "Start" tags are written consecutively, this means that boot is repeatedly conducted without normally ending the boot processing and without transition to Setup processing. This case can be determined that trouble happens in the system boot.

The control unit 15 may cause a transition to the recovery mode when a plurality of "Start" tags is consecutively written a plurality of times (e.g., twice) in the setting-data save area. That is, the control unit 15 may automatically determine whether or not to cause a transition to the recovery mode based on the types of a plurality of tags and the continuity (consecutive) of the tags written in the setting-data save area. In one example, the instruction unit 154 instructs the processing unit 152 to execute boot processing using the setting data written before the tag in the setting-data save area based on the types of a plurality of tags and the continuity of the tags written in the setting-data save area.

The condition on a transition to the recovery mode may include both of the condition based on the types of a plurality of tags and the continuity of the tags and the condition based on the user's operation. In one example, these conditions include whether a plurality of "Start" tags is consecutively written or not in the setting-data save area and whether user's operation as a trigger to a transition to the recovery mode is conducted or not. When both of these conditions are satisfied, the control unit 15 may cause a transition to the recovery mode.

When the space in the setting-data save area of the flash memory 17 is getting low, the memory control unit 155 executes garbage collection to the setting-data save area. The garbage collection deletes a part of the data written in the setting-data save area that is unnecessary for processing. In one example, continuously writing of data in the setting-data save area increases invalid data in the setting-data save area, so that the occupied area with the written data increases. This means that free space for newly writing is low, and the remaining space decreases. When the setting-data save area is almost full (and this may cause shortage of the free space), the memory control unit 155 executes garbage collection to increase the free area. Specifically the memory control unit 155 saves a part of the data written in the setting-data save area that is necessary for processing in a data area other than the setting-data save area, and then deletes all of the data written in the setting-data save area. After the deletion, the memory control unit 155 writes (returns) the saved data necessary for processing in the setting-data save area.

In one example, the memory control unit 155 deletes at least a part of the setting data in the setting-data save area depending on the space of the writable area in the setting-data save area. Such a deleted part of the setting data is other than the latest setting data for each of the settings and in the area before the tag (predetermined oldest tag) traced back from the tag written at the end by a predetermined number of tags. The memory control unit 155 deletes a part of the setting data other than the latest setting data for each of the settings in the areas between the tags after the tag traced back from the tag written at the end by a predetermined number of tags. When the space in the setting-data save area is getting low, this configuration keeps the writable free area in the setting-data save area while leaving the setting data that can be used for recovery.

The memory control unit 155 may determine about the execution or not of garbage collection based on whether the writable space in the setting-data save area is less than a predetermined threshold or not. The memory control unit 155 may determine about the writable space in the setting-data save area being less than a predetermined threshold or not based on whether the amount of data written in the setting-data save area is equal to or more than a predetermined threshold.

The display control unit 156 outputs various types of display information to be displayed on the display unit 13 in accordance with the processing by the processing unit 152. The display control unit 156 controls ON/OFF of the output of the display information (i.e., ON/OFF of the screen) in accordance with the instruction from the processing unit 152. When the display unit 13 includes a liquid crystal display panel with a backlight, the ON/OFF control of the output of the display information includes the ON/OFF control of the backlight as well.

(Processing in Recovery Mode)

Next the following describes the processing in the recovery mode executed by the control unit 15.

Figure 9:
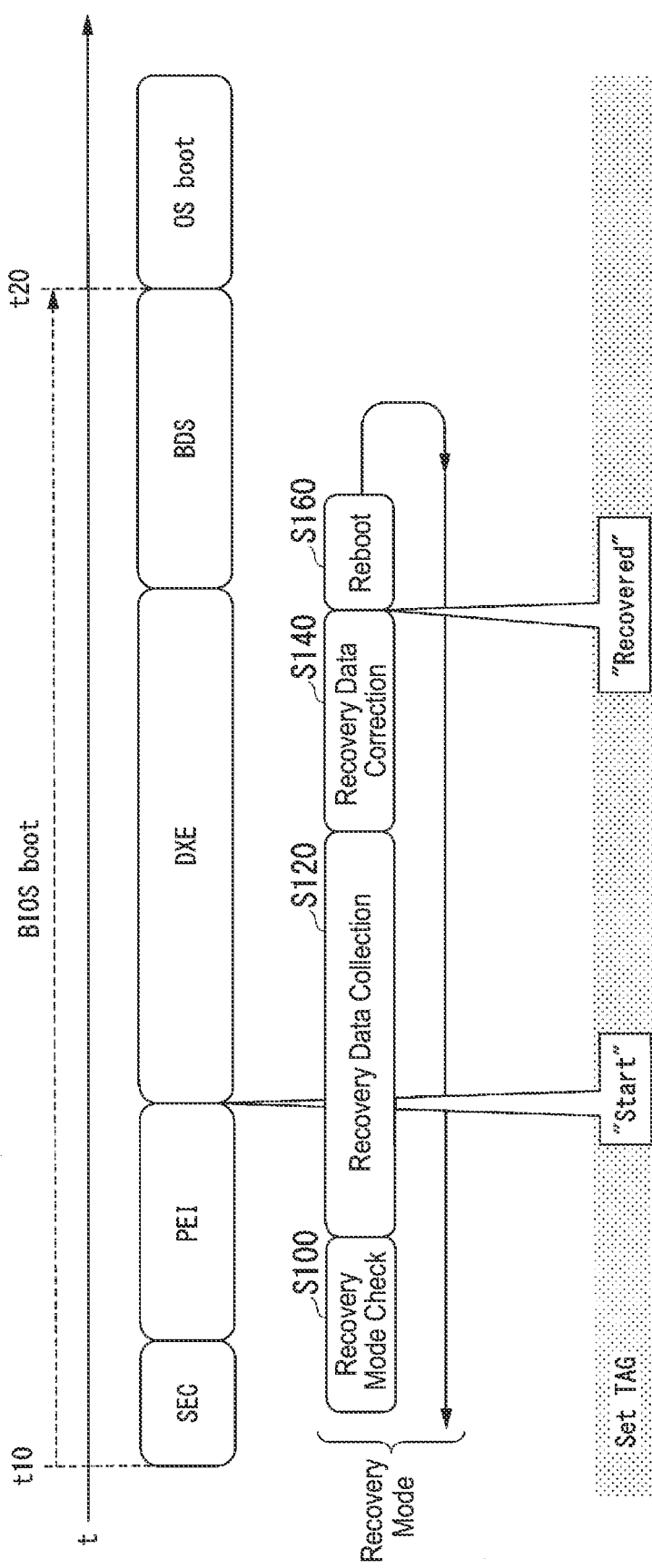
FIG. 9 schematically shows the processing in the recovery mode according to one embodiment.

FIG. 9 schematically shows the processing in the recovery mode according to the present embodiment. This drawing shows an example of the processing in the recovery mode relative to the boot processing in FIG. 4. When the BIOS boot starts (time t10), the control unit 15 executes recovery mode checking (step S100) to check the presence or not of a trigger to a transition to the recovery mode (whether or not cause a transition to the recovery mode). When the control unit 15 confirms a trigger to a transition to the recovery mode, the control unit 15 executes recovery data collection (S120) to collect setting data (recovery data) used for recovery. Next the control unit 15 executes recovery data correction (S140) to correct the collected setting data (recovery data) to be valid setting data that can be used for boot processing. The control unit 15 writes the collected setting data as valid setting data in the setting-data save area, and then writes a "Recovered" tag that indicates that the setting data is recovered. The control unit 15 then uses the corrected setting data (recovery data) to reboot the system (S160).

Next the following describes each step in the recovery mode in details. Firstly the following describes the operation in the recovery mode checking at step S100 of FIG. 9.

Figure 10:
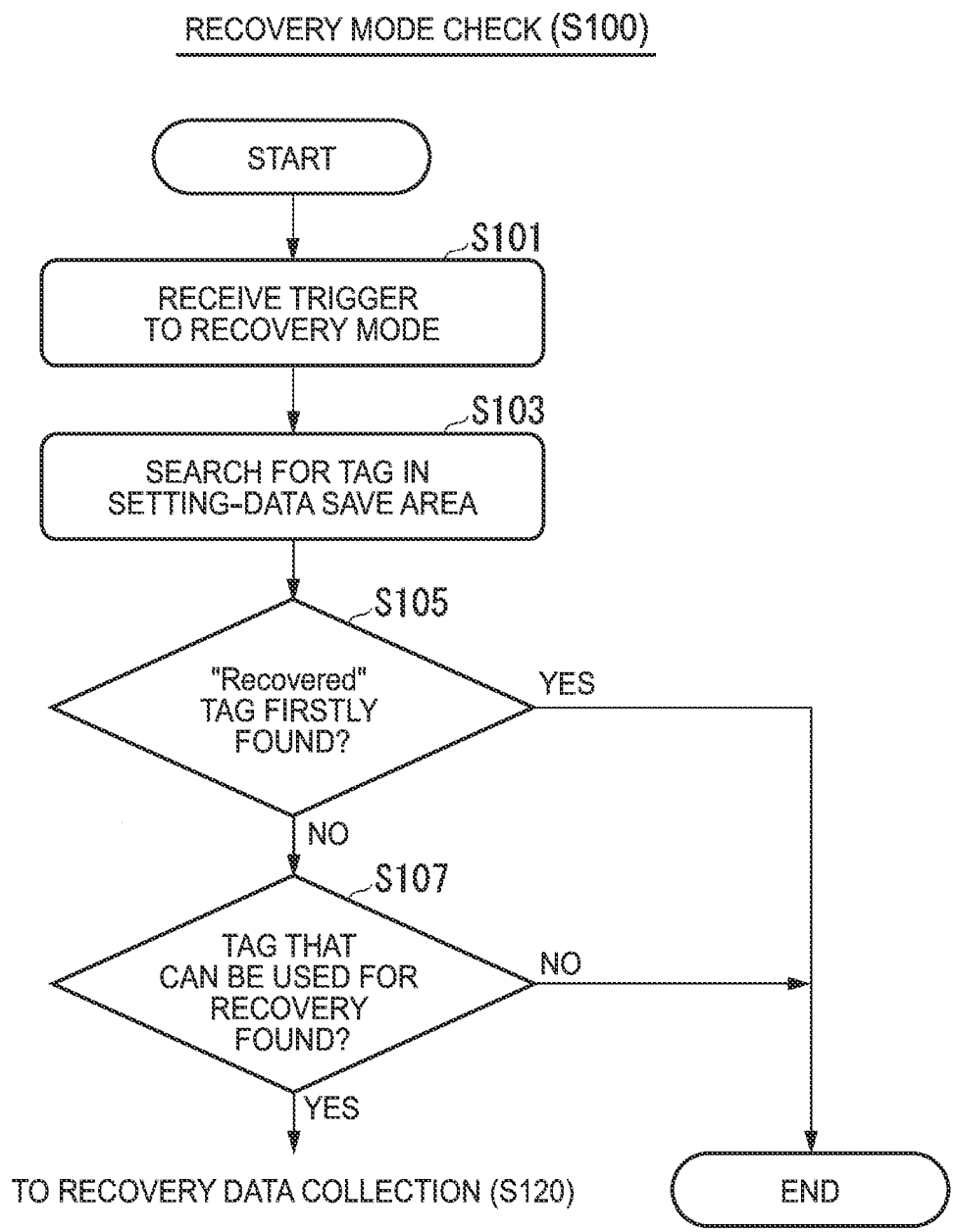
FIG. 10 is a flowchart showing one example of the recovery mode checking according to one embodiment.

FIG. 10 is a flowchart showing one example of the recovery mode checking according to the present embodiment.

(Step S101) The control unit 15 receives a trigger to the recovery mode after starting of the BIOS boot, and then the procedure shifts to step S103. The trigger may be a specific operation by the user, consecutively writing of "Start" tags a plurality of times (e.g., twice), or both of them.

(Step S103) The control unit 15 searches for the tags written in the setting-data save area in the reverse chronological order from the block written at the end. Then the procedure shifts to step S105.

(Step S105) The control unit 15 determines whether a "Recovered" tag is firstly found or not based on the result of searching for tags at step S103. When it is determined that a "Recovered" tag is firstly found (YES), this means the execution of recovery at the last boot. The control unit 15 then ends the recovery mode without executing the recovery processing. In this case, the control unit 15 may continue the boot processing, or may reboot. When the firstly found tag is not a "Recovered" tag (NO), then the control unit 15 shifts to step S107.

(Step S107) The control unit 15 determines whether a tag that can be used for recovery is found or not based on the result of searching for tags at step S103. A tag that can be used for recovery is a "Boot" tag or a "Setup" tag, for example. Such a tag that can be used for recovery may be a predetermined one type of tag, or may be selected from a plurality of types of tags based on the predetermined priority. In one example, the predetermined priority may be the priority based on the searching order (e.g., a tag that is firstly found has the priority among the tags that can be used for recovery), or the priority based on the types (e.g., when both of a "Boot" tag and a "Setup" tag are found, the "Boot" tag has the priority). When the control unit 15 determines that no tags that can be used for recovery are found (NO), the control unit 15 ends the recovery mode without executing the recovery processing. In this case, the control unit 15 may continue the boot processing, or may reboot. When the control unit 15 determines that a tag that can be used for recovery is found (YES), the procedure shifts to the recovery data collection at step S120 (see FIG. 9).

Figure 11:
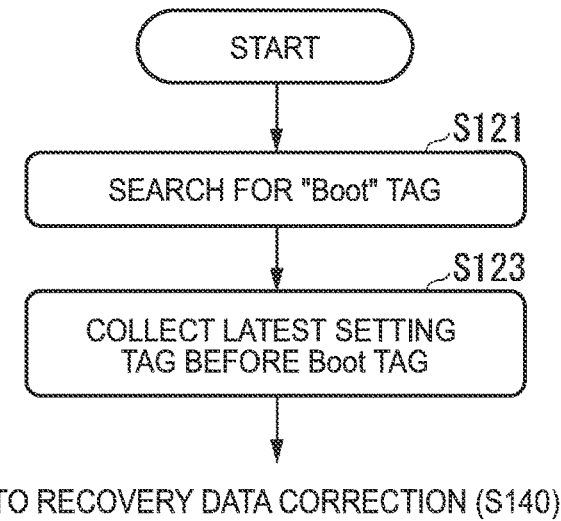
FIG. 11 is a flowchart showing one example of the recovery data collection according to one embodiment.

FIG. 11 is a flowchart showing one example of the recovery data collection according to the present embodiment. The following describes the procedure while letting that a tag that can be used for recovery is a "Boot" tag.

(Step S121) The control unit 15 searches for a "Boot" tag for recovery, and then the procedure shifts to step S123.

(Step S123) The control unit 15 collects the latest setting data before the "Boot" tag as the setting data used for recovery, and the procedure shifts to recovery data correction at step S140 (see FIG. 9).

Figure 12:
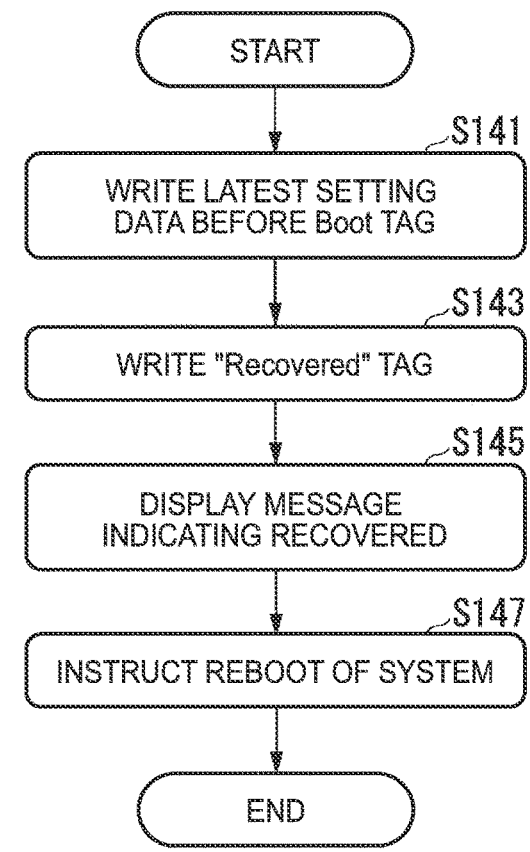
FIG. 12 is a flowchart showing one example of the recovery data correction according to one embodiment.

FIG. 12 is a flowchart showing one example of the recovery data correction according to the present embodiment.

(Step S141) The control unit 15 writes the latest setting data before the "Boot" tag (recovery data) collected at the recovery data collection in the setting-data save area. Then the procedure shifts to step S143.

(Step S143) The control unit 15 writes a "Recovered" tag in the setting-data save area. Then the procedure shifts to step S145.

(Step S145) The control unit 15 controls the display unit 13 to display a message indicating the execution of recovery. Then the procedure shifts to step S147.

(Step S147) The control unit 15 instructs reboot of the system.

The control unit 15 then shifts to step S160 in FIG. 9 to reboot the system using the latest setting data before the "Boot" tag (recovery data) to reboot the system (execute the boot processing). That is, the control unit 15 reboots the system for recovery using the BIOS settings when the boot processing normally ended the last time.

(Processing in the Garbage Collection)

Next the following describes the processing in the garbage collection executed by the control unit 15.

Figure 13:
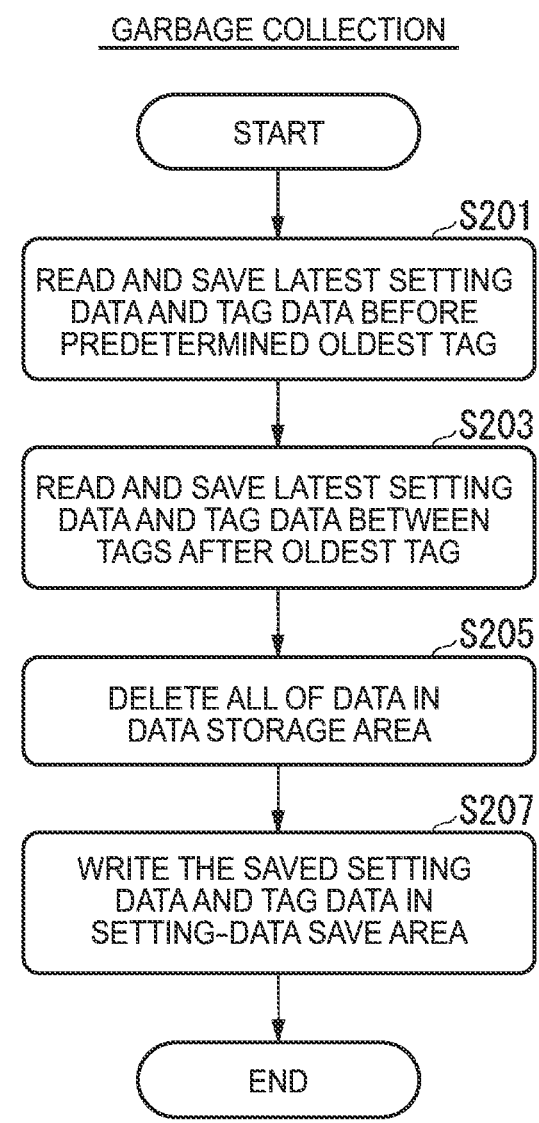
FIG. 13 is a flowchart showing one example of the garbage collection according to one embodiment.

FIG. 13 is a flowchart showing one example of the garbage collection according to the present embodiment.

(Step S201) The control unit 15 reads the latest setting data and tag data from the setting-data save area before the tag traced back from the tag written at the end by a predetermined number of tags (predetermined oldest tag), and once saves them in a data area of the flash memory 17 other than the setting-data save area. At this step, the control unit 15 saves the read setting data and tag data in the originally writing order. Then the procedure shifts to step S203.

(Step S203) The control unit 15 reads the latest setting data and tag data from the setting-data save area between the tags after the predetermined oldest tag, and once saves them in a data area of the flash memory 17 other than the setting-data save area. At this step, the control unit 15 saves the read setting data and tag data in the originally writing order. Then the procedure shifts to Step S205.

(Step S205) The control unit 15 deletes all of the data in the data save area, and then shifts to step S207.

(Step S207) The control unit 15 writes (returns) the saved setting data and tag data in the setting-data save area in the saved order.

As described above, the information processing apparatus 10 of the present embodiment includes the processing unit 152, the writing unit 153, and the instruction unit 154. The processing unit 152 writes setting data to be used for the BIOS boot in the changing order in the setting-data save area (one example of a predetermined area) in the flash memory 17 (one example of a non-volatile memory), and executes the BIOS boot using the setting data. At a predetermined timing during the BIOS boot, the writing unit 153 writes the tag corresponding to the timing in the setting-data save area of the flash memory 17. The instruction unit 154 instructs the processing unit 152 to execute the BIOS boot using the setting data written before the tag in the setting-data save area of the flash memory 17.

With this configuration, the information processing apparatus 10 easily returns the settings to the previous settings based on the tag written at a predetermined timing during the duration of the BIOS boot, and executes the BIOS boot. This does not require the user themselves to conduct the burdensome job of saving the settings for recovery. For instance, when normal ending of the boot processing based on the current setting data fails (when system trouble occurs, for example), the information processing apparatus 10 executes the boot processing again using the previous setting data for recovery. A conventional way of saving the BIOS setting data with a snapshot requires a large-capacity storage, and an additional storage may be required in this case. Such a case of saving the setting information in the additional storage may require the booting of the system at least up to a stage enabling an access to the additional storage. Recovery therefore may fail in some situations. The present embodiment uses the past setting data (invalid data) stored in the flash memory 17, and so does not require an additional storage. The present embodiment therefore enables recovery at low cost and without the necessity of boot processing up to the stage enabling an access to the additional storage.

In one example, the predetermined timing includes an end timing of the BIOS boot. In one example, the information processing apparatus 10 writes a "Boot" tag in the setting-data save area at the end timing of the BIOS boot.

This allows the information processing apparatus 10 to, when normal ending of the boot processing based on the current setting data fails (when system trouble occurs, for example), to return to the previous (e.g., the last time) BIOS settings when the boot processing ended normally and execute the boot processing.

In one example, the predetermined timing includes a timing when the flash memory 17 is ready for data writing. In one example, the information processing apparatus 10 writes a "Start" tag in the setting-data save area at a timing when the flash memory 17 is ready for data writing.

This allows the information processing apparatus 10 to tell that a part from the "Start" tag to the next "Start" tag in the setting-data save area is the setting data that is changed during one system boot. In one example, the information processing apparatus 10 returns the BIOS settings to the settings used for the previous (e.g., the last time) boot processing using the "Start" tag and executes the boot processing.

In one example, the BIOS boot includes setup processing enabling the user to change setting data used for the boot processing, and the predetermined timing includes a start timing of the Setup processing.

When normal end of the boot processing fails due to a change of the BIOS settings by the user (when system trouble occurs, for example), the information processing apparatus 10 returns to the BIOS settings before the change and then executes the boot processing.

In one example, the instruction unit 154 instructs the processing unit 152 to execute the BIOS boot using the latest setting data for each of the settings in the setting data written before the tag in the setting-data save area of the flash memory 17.

With this configuration, the information processing apparatus 10 easily returns to the latest settings before the tag based on the tag written at a predetermined timing during the duration of the BIOS boot, and executes the BIOS boot.

To use the BIOS boot, the writing unit 153 writes at least a part of the setting data before the tag in the setting-data save area of the flash memory 17 after the setting data written at the end.

This allows the information processing apparatus 10 to use invalid setting data used in the previous boot processing as the latest valid setting data for the boot processing.

In response to the user's operation, the instruction unit 154 instructs the processing unit 152 to execute the BIOS boot using the setting data written before the tag in the setting-data save area of the flash memory 17.

With this configuration, when the user wants to boot the information processing apparatus 10 in the recovery mode, the information processing apparatus 10 boots in the recovery mode in response to the user's operation as a trigger.

The instruction unit 154 instructs the processing unit 152 to execute BIOS boot using the setting data written before the tag in the setting-data save area in accordance with the types of a plurality of tags and the continuity of the tags written in the setting-data save area of the flash memory 17. In one example, the instruction unit 154 instructs the execution of BIOS boot using the previously written setting data when a plurality of "Start" tags is consecutively written a plurality of times (e.g., twice).

This allows the information processing apparatus 10 to, when normal ending of the boot processing fails (when system trouble occurs, for example), to detect the failure automatically and execute the BIOS boot using the previously written setting data.

When a plurality of tags is written in the setting-data save area, the user may select to what point in time to return the settings of the system. In one example, the display unit 13 of the information processing apparatus 10 may display a selection screen showing the options of the correspondences of the date and time information when the plurality of tags were written and the contents of processing corresponding to the tags ("Boot", "Setup" and the like), and this allows the user to select to what point in time to return the settings. The information processing apparatus 10 then may execute the boot processing using the latest setting data before the tag of the option selected through the user's operation. In one example, the instruction unit 154 instructs the processing unit 152 to execute BIOS boot using the setting data written before the tag selected by the user among the plurality of tags written in the setting-data save area of the flash memory 17.

With this configuration, the information processing apparatus 10 allows the user to select to what point in time to return the settings of the BIOS, and so the system boots with the settings desired by the user.

The information processing apparatus 10 includes the memory control unit 155. The memory control unit 155 deletes at least a part of the setting data in the setting-data save area depending on the space of the writable area in the setting-data save area of the flash memory 17. Such a deleted part of the setting data is other than the latest setting data for each of the settings and in the area before the tag traced back from the tag written at the end by a predetermined number of tags.

This allows the information processing apparatus to keep the latest valid setting data and delete unnecessary data while leaving recovery data. This configuration therefore prevents the shortage of the free space due to the occupation of the setting-data save area in the flash memory 17 while keeping the state of enabling the recovery processing.

The memory control unit 155 deletes a part of the setting data other than the latest setting data for each of the settings in the areas between the tags after the tag traced back from the tag written at the end (latest tag) by a predetermined number of tags. When setting data is written in the area after the tag written at the end (latest tag), the memory control unit 155 may delete a part of the setting data other than the latest setting data for each of the settings in the area.

This allows the information processing apparatus to keep the latest valid setting data and delete unnecessary data while leaving recovery data. This configuration therefore prevents the shortage of the free space due to the occupation of the setting-data save area in the flash memory 17 while keeping the state of enabling the recovery processing.

That is the detailed description of one embodiment of the present invention with reference to the drawings. The specific configuration is not limited to the embodiment as stated above, and the embodiment can be variously changed in design or the like without departing from the scope of the invention. The configurations described in the above embodiment can be combined freely.

The above embodiment describes an example of having a plurality of types of tags, which may be at least one type of tags.

The processing in the recovery mode as described above may be conducted not only for a failure in the normal ending of the boot processing (when system trouble occurs, for example) but also for the normal ending of the boot processing and when the user wants to return the settings to the previous settings for boot processing.

The above embodiment describes the case where the information processing apparatus 10 executes garbage collection based on the writing state (e.g., the remaining space) of data in the setting-data save area of the flash memory 17. In another embodiment, garbage collection may be executed at a constant period or at a predetermined timing irrespective of the writing state of data in the setting-data save area.

The above-stated information processing apparatus 10 internally includes a computer system. A program to implement the functions of various configurations of the information processing apparatus 10 as stated above may be stored in a computer-readable recording medium, and the processing at the various configurations of the information processing apparatus 10 may be performed by causing the computer system to read and execute the program stored in this recording medium. "Causing the computer system to read and execute the program stored in the recording medium" includes installing of such a program in the computer system. The "computer system" here includes an OS and hardware, such as peripherals. The "computer system" may include a plurality of computer devices connected via a network, including the internet and communication lines such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the information processing apparatus 10. Alternatively, different distribution servers may distribute these divided pieces of program. The "computer readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions that the information processing apparatus 10 of the above-described embodiment has may be implemented as an integrated circuit, such as a LSI (Large Scale Integration). Each of the functions as stated above may be implemented as one processor, or a part or all of the functions may be implemented as one processor in an integrated manner. A technique for integrated circuit is not limited to a LSI, and an integrated circuit may be realized using a dedicated circuit or a general-purpose processor. If a technique for integrated circuit that replaces LSIs becomes available with the development of a semiconductor techniques, an integrated circuit based on such a technique may be used.

The invention claimed is:

1. An information processing apparatus comprising:
 a processing unit that writes setting data for a current boot processing by BIOS (Basic Input Output System) in a predetermined area of a non-volatile memory in a chronological order, and executes the current boot processing based on the chronologically ordered setting data;
 a writing unit that writes a tag in the predetermined area of the non-volatile memory at a predetermined time, wherein the tag is associated only with a prior boot processing that ended normally, the tag corresponding to the predetermined time; and
 an instruction unit that instructs the processing unit to execute the current boot processing using a most recently written valid setting data before the tag in the predetermined area of the non-volatile memory;
 wherein the most recently written valid setting data corresponds to the prior boot processing that normally ended before the current boot processing.

2. The information processing apparatus according to claim 1, wherein the predetermined time includes an end time of the boot processing that normally ended.

3. The information processing apparatus according to claim 1, wherein the predetermined time includes a time when the non-volatile memory is ready for data writing.

4. The information processing apparatus according to claim 1, wherein the boot processing that normally ended includes setup processing enabling a user to change setting data used for the current boot processing, and
 the predetermined time includes a start time of the setup processing.

5. The information processing apparatus according to claim 1, wherein
 the instruction unit instructs the processing unit to execute the current boot processing by using the latest setting data for each setting among the setting data written before the tag in the predetermined area of the non-volatile memory.

6. The information processing apparatus according to claim 1, wherein
 the writing unit writes at least a part of setting data written before the tag in the predetermined area of the non-volatile memory to be used for the current boot processing, and the writing unit writes the part of setting data after an end of the setting data written.

7. The information processing apparatus according to claim 1, wherein
 the instruction unit instructs the processing unit to execute the current boot processing using setting data written before the tag in the predetermined area of the non-volatile memory in accordance with a user operation.

8. The information processing apparatus according to claim 1, wherein the writing unit writes a plurality of the tags in the predetermined area of the non-volatile memory at a predetermined time during the boot processing that normally ended, and
 the instruction unit instructs the processing unit to execute the current boot processing using setting data written before the tag in the predetermined area based on types and consecutiveness of the plurality of tags written in the predetermined area of the non-volatile memory.

9. The information processing apparatus according to claim 1, wherein the writing unit writes a plurality of the tags in the predetermined area of the non-volatile memory at a predetermined time during the boot processing that normally ended, and
 the instruction unit instructs the processing unit to execute the current boot processing using setting data written before the tag that is selected by a user among the plurality of tags written in the predetermined area of the non-volatile memory.

10. The information processing apparatus according to claim 1, further comprising a memory control unit that deletes at least a part of the setting data written in the predetermined area depending on space of a writable area in the predetermined area of the non-volatile memory, the deleted part of the setting data being other than the latest setting data for each setting and in an area before a second tag traced back from a first tag written at an end by a predetermined number of the tags.

11. The information processing apparatus according to claim 10, wherein the memory control unit deletes setting data other than the latest setting data for each of the settings in areas between the tags after the second tag traced back from the first tag written at the end by a predetermined number of the tags.

12. A control method of an information processing apparatus comprising:

a step executed by a processing unit of writing setting data for a current boot processing by BIOS (Basic Input Output System) in a predetermined area of a non-volatile memory in a chronological order, and executing the current boot processing based on the chronologically ordered setting data;

a step executed by a writing unit of writing a tag in the predetermined area of the non-volatile memory at a predetermined time, wherein the tag is only associated with a prior boot processing that normally ended before the current boot processing, the tag corresponding to the predetermined time; and a step executed by an instruction unit of instructing to execute the current boot processing using setting data written before the tag in the predetermined area of the non-volatile memory.

* * * * *